United States Patent [19]
O'Mara et al.

[11] Patent Number: 5,510,812
[45] Date of Patent: Apr. 23, 1996

[54] PIEZORESISTIVE INPUT DEVICE

[75] Inventors: Kerry D. O'Mara, Florence; Paul J. Smalser, Sr., Hamilton Square, both of N.J.

[73] Assignee: Hasbro, Inc., Pawtucket, R.I.

[21] Appl. No.: 231,234

[22] Filed: Apr. 22, 1994

[51] Int. Cl.$^6$ ........................................ G09G 5/08
[52] U.S. Cl. ........................... 345/161; 345/156
[58] Field of Search ............................... 345/156, 157, 345/161, 168; 338/128, 4

[56] References Cited

U.S. PATENT DOCUMENTS

| | | | |
|---|---|---|---|
| 4,313,113 | 1/1982 | Thornburg | 345/157 |
| 4,520,240 | 5/1985 | Swindler | 345/168 |
| 4,680,577 | 7/1987 | Straayer et al. | 345/161 |
| 4,736,191 | 4/1988 | Matzke et al. | 345/157 |
| 4,932,265 | 6/1990 | Skuratovsky et al. | 338/4 |
| 5,230,559 | 7/1993 | Nielsen et al. | 345/161 |
| 5,252,970 | 10/1993 | Baronowsky | 345/161 |
| 5,278,557 | 1/1994 | Stokes et al. | 338/128 |

*Primary Examiner*—Curtis Kuntz
*Assistant Examiner*—Vivian W. Chang
*Attorney, Agent, or Firm*—Hughes Hubbard & Reed

[57] ABSTRACT

An input device for computers or electronic games using piezoelectric elements. Four piezoelectric devices are mounted on a base in positions ninety degrees apart. A user actuation element, such as a directional control pad and or a joystick is pivotally disposed on the base above the piezoelectric sensors. A biasing element such as a spring, foam or rubber element is positioned between the actuation element and the base to support the actuation device in a neutral position when no face is being applied by a user to also return the activation element to its neutral position after a user's force is removed. Opposing sensors are connected to a bridge circuit such that in the neutral position of the actuation element the output voltage of the bridge is one half of the input voltage. As the user applies a force to the actuation device, the resistance of one or the other (opposing) piezoresistive device will decrease and accordingly drive the output of the bridge circuit either towards the input voltage or ground, depending on which sensor the user is activated. Additionally a piezoresistive device constructed according to the present invention uses a conductive foam overlayed on top of a series of circuit traces which describe open circuits. As the conductive foam is compressed, it will complete the circuit of the circuit traces and provide an output voltage varying with the compression of the foam.

17 Claims, 6 Drawing Sheets

PIEZORESISTIVE INPUT DEVICE

FIELD OF INVENTION

This invention generally relates to input control devices, and more particularly to analog joysticks or directional control pads using piezoresistive devices.

BACKGROUND OF THE INVENTION

A joystick is a well-known mechanical actuator for a device that can be used to provide control input to electronic games and computers. Another similar device is sometimes referred to as a directional control pad ("DCP"). A DCP generally has of an active area, usually circular, and is typically about one and one half inches in diameter. Application of pressure at various angular positions on the active area of a DCP produces a corresponding electrical output signal.

Most inexpensive controllers, of either the joystick or DCP type, provide only limited, coarse, output signals. This is due to the fact these devices generate their output signals by the use of four momentary switches. Typically, four leaf switches or conductive rubber dome switches are used for end point detection in each of four possible directions of motion of the actuator of the controller, e.g., "North", "South", "East" and "West" directions. In general, these switches are spaced 90 degrees from each other around the periphery of the input device. In these devices, a given amount of motion solely in the "North" direction, for example, causes the closure of only the single switch used to detect motion in this direction. The same is true for motions exclusively in the "South", "East", and "West" directions. Motion of the joystick in a "North-East" direction, can cause simultaneous closure of both the "North" and "East" switches. Likewise, dual switch closures will occur for joystick motion in the "North-West", "South-East", and "South-West" directions. Thus, there are only eight directions which can be represented by unique output states of such a simple device. Furthermore, in devices which use momentary switches, the output of the device merely indicates a switch being "on" or "off", and no output signal is generated which indicates the magnitude of the force being applied by the user in that direction.

One significant problem with the electromechanical devices as described above is that they are subject to an increase in the resistance of the switch contacts due to, for example, wear, misalignment, oxidation, and accumulation of dirt. As the contact resistance increases, the switch begins to fail on an intermittent basis. Intermittent failures of an input controller are particularly unacceptable in a game environment where split second reactions by a user are often required. Devices based upon mechanical switches also suffer from the inherent variations from one switch to another, such as the gap between contacts and spring stiffness. These variations will result in inconsistent and uneven position indication from the control device, and provide inadequate sensitivity for certain applications of the device. Additionally, mechanical switches are also subject to switch bounce in which the output of the switch will oscillate between its "on" and "off" voltages for several milliseconds after being switched.

It is therefore one object of the present invention to provide a practically infinite resolution of the angular direction of the motion or force applied to an input controller. It is an additional object of the present invention to indicate the amplitude of the motion or force applied in a specific direction to an input controller. It is also an object of the present invention to decrease the cost of producing an analog control device. It is a further object of the invention to increase the resilience of an input device to conventional wear. It is also an object of the present invention to construct a piezoresistive input device using a conductive foam.

SUMMARY OF THE INVENTION

The present invention is a novel input device for computers or electronic games which uses piezoelectric elements to sense input from a user. Four piezoresistive devices are mounted on a base, e.g., a printed circuit board, in positions corresponding to the North, South, East and West positions of a compass. A user actuation element, such as a directional control pad and or a joystick is pivotally disposed on the base above the piezoelectric sensors. Additionally, a biasing means such as a spring, foam or rubber element is positioned between the actuation element and the base. The biasing means supports the actuation element in a neutral position when no force is being applied by a user and also returns the activation element to this neutral position after a user's force is removed. A biasing means in the form of a foam or rubber element also serves the function of transferring a user's input force from the actuation element to the piezoresistive sensors.

In operation, as a user applies a force to the actuation element, the force is translated into a change in the resistance of one or more of the piezoresistive sensors. Opposing sensors are connected to a bridge circuit such that, in the neutral position of the actuation element (where the resistance of the sensors is equivalent to an open circuit) the output voltage of the bridge is one half of the input voltage. As the user applies a force to the actuation element, the resistance of one or the other (opposing) piezoresistive sensor will decrease, and accordingly drive the output of the bridge circuit either towards the input voltage or ground, depending on which sensor is activated.

Having two identical circuits connected to the two pairs of opposing piezoresistive devices provides two output signals which completely describe the magnitude and direction of any force applied by the user to the actuation element.

A novel aspect of the present invention is the use of a conductive foam in the construction of a piezoresistive device. Instead of using the standoff technology of the prior art, a piezoresistive device constructed according to the present invention uses the conductive foam overlayed on top of a series of circuit traces which describe open circuits. As the conductive foam is compressed, it will complete the circuit of the circuit traces and provide an output voltage varying with the compression of the foam.

DETAILED DESCRIPTION OF THE PREFERRED EMBODIMENTS

Figure 1:
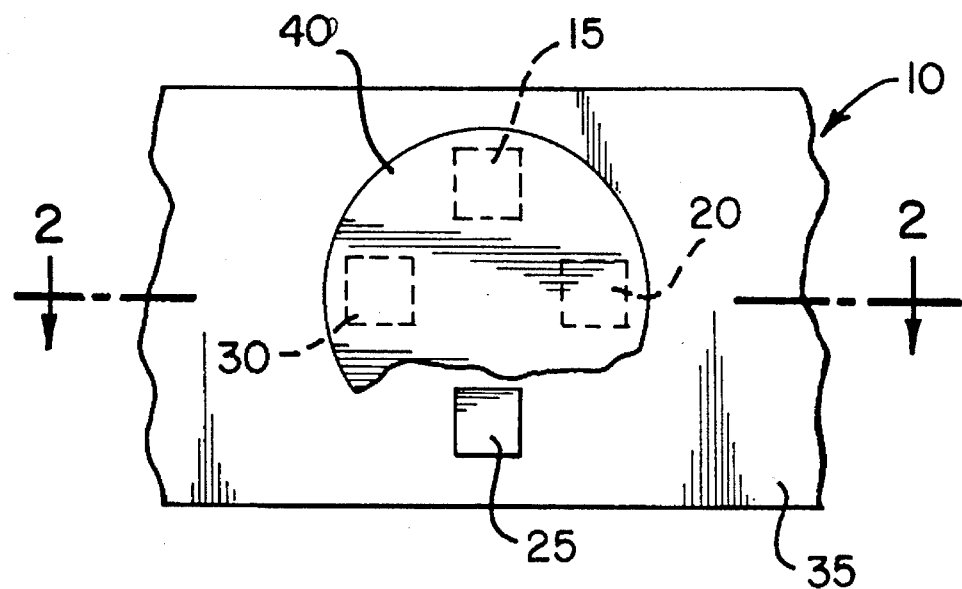
FIG. 1 is a plan view and partial cut away of a device constructed according to the present invention.

FIG. 1 is a plan view and partial cross section of a device 10 constructed according to the present invention. Device 10 can be used as an input device, for example, to a computer (e.g., as cursor control) or to an electronic game. Depicted in FIG. 1 are piezoresistive elements 15, 20, 25, 30, a base 35, and a partial cut away of a directional control pad or disk 40. Disk 40, as shown in FIG. 1., is circular in construction and is approximately about one and a half inches in diameter. The circular design of disk 40 shown in this Figure is merely one embodiment of the present invention. Disk 40 can be constructed as a square, oval or any desired shape so long as the area of disk 40 covers each of the piezoresistive elements 15–30. Disk 40 is an actuation device used to accept input, in the form of a force applied by user, when the user wishes to effect control on a system (not shown) to which device 10 is attached. In the construction of disk 40 shown in FIG. 1, a user can apply a force using her or his fingers directly on the surface of disk 40. Alternatively, a joystick (not shown) could be mounted to the top of disk 40 to aid in a user's actuation of device 10.

Base 35, to which piezoresistive elements 15–30 are mounted, can be constructed of any suitable material such as low cost FR4, printed circuit board substrate material, or any other suitable plastic or hard material. In the preferred embodiment of the present invention, base 35 is a circuit board to which the inputs and outputs (not shown) of piezoresistive elements 15–30 are connected.

As illustrated in FIG. 1, piezoresistive elements 15–30 are arrayed on base 35, under disk 40, in positions corresponding to compass directions "North" (element 15), "South" (element 25), "East" (element 20), and "West" (element 30). These directional notations will be used throughout this discussion to refer to the specific piezoresistive element 15'30 found at that location. Piezoresistive elements 15–30 of the present invention are devices whose resistance varies with the amount of pressure applied to them. Some piezoresistive devices, such as the ones used in one embodiment of the present invention, are also known as "force sensitive resistors" or FSR's. Each piezoresistive element 15–30 provides an analog output related to the magnitude of the force applied to the element 15–30. For example, as a force is applied to disk 40 in the North direction, disk 40 transfers this force to piezoresistive element 15 and thus causing a change in the electrical output level from the North sensor 15. Similarly, a force applied in any other direction will produce a corresponding change in the output level of the piezoresistive element 20–30 located in that direction.

In addition to forces applied directly in a North, South, East or West direction, a force applied in an intermediate direction (e.g., North-East) will produce changes in the outputs of two piezoresistive elements 15–30. For example, if a user applies a force on disk 40 somewhere between the quadrant defined by piezoresistive elements 15 and 20 (e.g., in a North-East direction), the outputs of both elements 15 and 20 will be changed. Thus, because of the physical arrangement of the four piezoresistive elements 15–30 as depicted in FIG. 1, any force applied anywhere on disk 40 (with one possible exception of a force applied directly in the center of disk 40), through the combination of their four analog outputs, be converted through electronic circuitry into a magnitude and direction. A unique analog output combination of the four elements 15–30, will exist for each angular position of force applied to disk 40.

Figure 2:
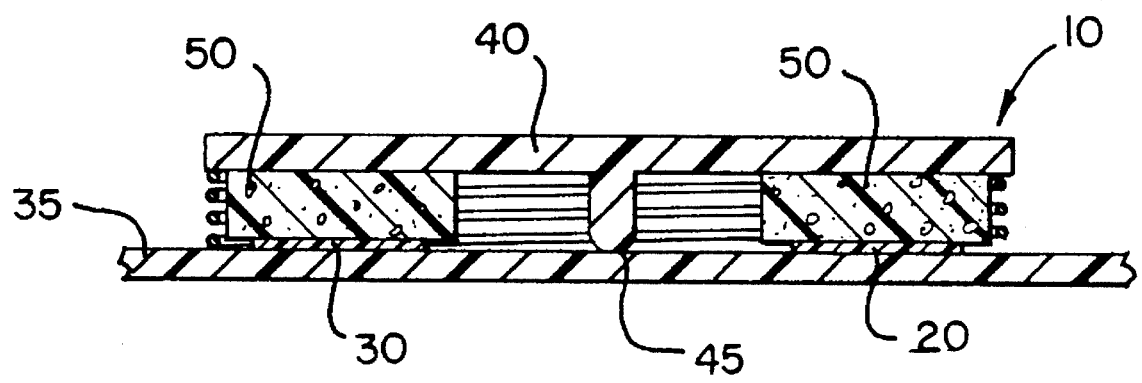
FIG. 2 is a cross section of the device of FIG. 1 taken along line 2—2.

FIG. 2 is a cross section of the device of FIG. 1 taken along line 2—2. The cross section depicted in this Figure is symmetrical to a cross section which could be taken along a North-South line through piezoresistive elements 15 and 25 of FIG. 1. As seen in FIG. 2, there is a pivot element 45 depending from the center of the bottom of disk 40. In operation, as pressure is applied to disk 40, at any point except its exact center, disk 40 will rock on pivot element 45. Also shown in FIG. 2 are a foam or rubber pressure pad 50 and a spring 60. One function of pad 50 is to transfer mechanical forces applied to disk 40 to piezoresistive elements 15–30. As a user applies a force to disk 40, it will rock on pivot 45 and the force will be transferred to pad 50. Depending on where the force is applied to disk 40, pad 50 will transfer the force to one or more piezoresistive elements 15–30. For example, if a user applies a force directly in the West direction, the force will solely be transferred to piezoresistive element 30. If the force is applied directly in the North-West direction, the force will be equally distributed to piezoresistive elements 30 and 15. If the force is applied in North-West direction, but more to the West, a greater amount of the force will be applied to piezoresistive elements 30 than will be transferred to element 15.

Both pad 50 and spring 60 are used to provide mechanical resistance or "feel" to device 10 as the user applies force to disk 40. Pad 50 depicted in this Figure is doughnut shaped in order to provide mechanical resistance around the entire circumference of disk 40. Elements 50 and 60 additionally perform the function of biasing disk 40 to a neutral position (the one shown in FIG. 2) such that it will return to this neutral position after a force has been applied to disk 40. In the neutral position, the outputs of piezoresistive elements 15–30 reflect on infinite resistance since elements 15–30 are open circuits when no pressure is applied to them. If an appropriate material is chosen for pad 50, spring 60 is an optional element of device 10, as pad 50 will provide all of the bias required to return disk 40 to its neutral position.

The choice of materials and properties for pad 50 and spring 60 is at the discretion of the designer. The design criteria in the choice materials for pad 50 include, for example, the relative stiffness of the material (i.e., its resistance to compression), the time the material takes to decompress (i.e., its internal damping), the compression set characteristics and the expected cycle lifetime of the material (i.e., how many cycles of compression/decompression will the material endure before degradation of its characteristics). With regards to the compression set characteristics, it is desirable to have a material which will not experience permanent deformation of its shape if it is under compression for some period of time. In one application of the present invention, a fast action electronic game environment, it is preferable to have material which has low internal damping and will return quickly to its neutral position. The preferred material used for pad 50 is a silicone rubber with a durometer value of 40 to 50.

As can be appreciated by the geometry of disk 40, pivot 45 and piezoresistive elements 15–30 depicted in FIG. 2, only one of each opposing pair of piezoresistive devices (i.e., "East" 20 and "West" 30 or "North" 15 and "South" 25) can be activated at a time. For example, if a user applies force to disk 40 in the area above piezoresistive element 20, pad 50 will compress in this area, the force will be transmitted to element 20 and its output level will change. While this is happening, the opposite side of disk 40 (i.e., the area above element 30) will rise, pad 50 in this area will not be compressed, no force will be transferred to element 30 and thus, there will be no change in the output of element 30. This is an important feature to be exploited in the output connections of piezoresistive elements 15–30 to the associated circuitry depicted in FIG. 3.

Figure 3:
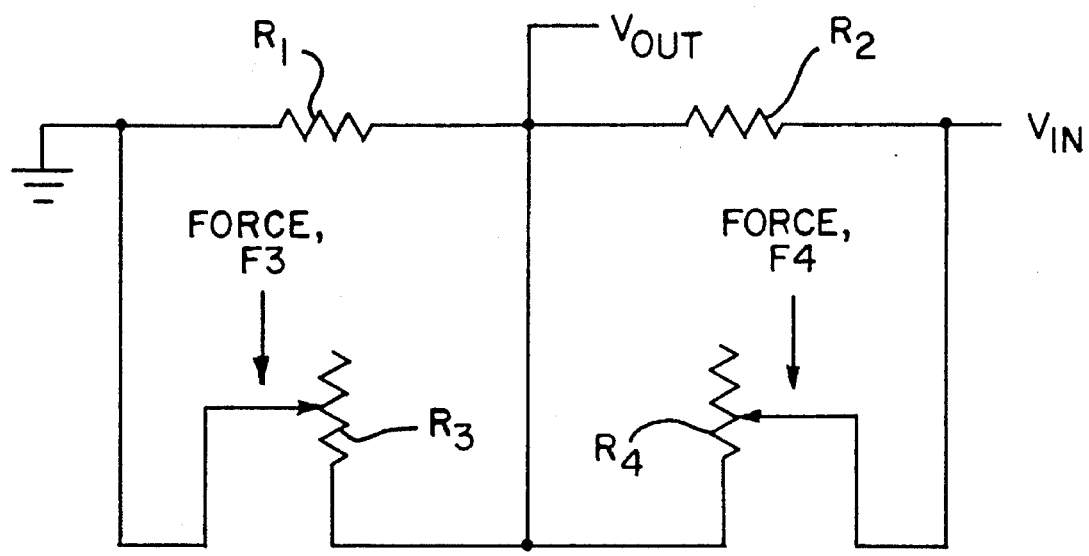
FIG. 3 illustrates a circuit used in the operation of the present invention.

FIG. 3 illustrates the novel manner in which a pair of piezoresistive elements 15 and 25 or 20 and 30 are connected. In order to operate device 10 of FIGS. 1 and 2 there are two circuits identical to the one shown in FIG. 3, each circuit being connected to one of a pair of piezoresistive elements, either elements 15 and 25 or elements 20 and 30. Resistors $R_3$ and $R_4$ schematically represent an opposing pair of piezoresistive elements as shown in FIG. 1. For example, if $R_3$ represents piezoresistive element 15 (North), then $R_4$ represents piezoresistive element 25 (South). Resistors $R_1$ and $R_2$ are used as biasing resistors. The values of resistors $R_1$ and $R_2$ used in this figure for this figure could be: $R_1=R_2=20K$ ohms. The values of $R_1$ and $R_2$ are driven by the sensitivity and range of the piezoresistive devices used. The values of 20K ohms for $R_1$ and $R_2$ are used for an example where $R_3$ and $R_4$ (representing piezoresistive devices) have a range between infinity (open circuit) and 4K to 5K ohms. If the piezoresistive devices have lower range of 40K or 50K ohms, the values of $R_1$ and $R_2$ would be accordingly adjusted upward. The goal in choosing the values of $R_1$ and $R_2$ is to provide a $V_{out}$ which is sensitive, but not too sensitive to changes in the resistances ($R_3$ and $R_4$) of the piezoresistive devices. Since $R_3$ and $R_4$ represent an opposing pair of piezoresistive elements 15 and 25 or 20 and 30, their values will be practically an open circuit when no force is applied to the element. When a force is applied to a piezoresistive element 15–30, the value of the corresponding $R_3$ or $R_4$ will equal a resistance that decreases as the applied force increases.

When disk 40 (FIG. 2) is in its neutral position (not tilted), the two resistances $R_3$ and $R_4$ will both be very high values (i.e. practically open circuits). Thus, in this neutral condition, since $R_1$ and $R_2$ are of equal values, the output of the circuit $V_{out}$ will be centered at a voltage of $V_{in}/2$. For example, if $V_{in}=5$ volts, the neutral position of disk 40 will result in an output voltage $V_{out}$ of 2.5 volts.

For an example of the operation of the circuit of FIG. 3, let it be assumed that $R_3$ represents the West piezoresistive sensing element 30 and that $R_4$ represents the East piezoresistive element 20. As user pushes down on disk 40 above East piezoresistive element 20, resistance $R_4$ will begin to decrease. This will cause output voltage $V_{out}$ to increase to a value closer to 5 volts. The harder the button is pushed (i.e., the more force that is applied) the resistance of $R_4$ will further decrease and output signal $V_{out}$ will driven closer to 5 volts.

In the converse of the above example, assume disk 40 tilted in the direction towards West piezoresistive device 30. In this case, $R_3$ will decrease and output voltage $V_{out}$ will drop from the neutral voltage of 2.5 volts, closer to the ground potential. If disk 40 is pushed harder in the West direction, output voltage $V_{out}$ will be driven even closer to the ground potential.

One of the advantages of the circuit of FIG. 3 is that the neutral (centered or non-tilted) position of disk 20 will produce an output voltage $V_{out}$ that is quite close to $V_{in}/2$. $V_{out}$ at the neutral position could be offset to a different value, if desired, by using non-equal resistor values for $R_1$ and $R_2$. This allows a manufacturer of a device according to the present invention not to have to perform any "offset" adjustment once the device has been assembled.

Another distinct advantage of the present circuit is that tilting disk 40 from to one side or the other will cause the output $V_{out}$ to range between input voltage $V_{in}$ and ground. Thus, $V_{out}$ is bounded by these two values ($V_{in}$ and ground). This means that no "gain" adjustments need to be made after a device assembled.

A further advantage which flows from the above two advantages is that since the gain and offset of the a circuit as shown in FIG. 3 is known, connecting $V_{out}$ to any processing circuitry will be of little difficulty. For example, $V_{out}$ could be connected to an analog to digital converter with no worry of overshooting the converter's range.

As described above, there are two circuits identical to the one shown in FIG. 3, used to operate device 10 of FIGS., 1 and 2. Each of these circuits is connected to one of a pair of opposing piezoresistive elements 15 and 25 or 20 and 30. Therefore, there are two $V_{out}$ signals from device 10 (FIGS. 1 and 2). One $V_{out}$ signal will describe the North-South state of disk 40 (i.e., the relative state of piezoresistive elements 15 and 25) while the other $V_{out}$ signal will describe the East-West state of disk 40 (i.e., the relative state of piezoresistive elements 20 and 30). By appropriately processing these two $V_{out}$ signals, one can fully describe the exact position and magnitude of any force applied to disk 40, around the entire 360° of disk 40's circumference. This is a great advantage over the mechanical switch devices of the prior art which could at best, provide only eight distinct outputs.

There are several ways in which to fabricate piezoresistive devices 15–30 required to implement the present invention as previously described. Below are two methods that are currently preferred due to their relative simplicity of construction. The first method is to construct piezoresistive sensors 15–30 using commercially available force sensitive resistors (FSR's) such as those available from Interlink Corp., Cupertino, CA. The second method uses a conductive foam such as that is available from The Fredericks Company, Huntington Park, Pa., and a circuit pattern on base 35 (FIGS. 1 and 2). Considerations of cost or specific functional details will determine which technology might be chosen for a given application.

Figure 4:
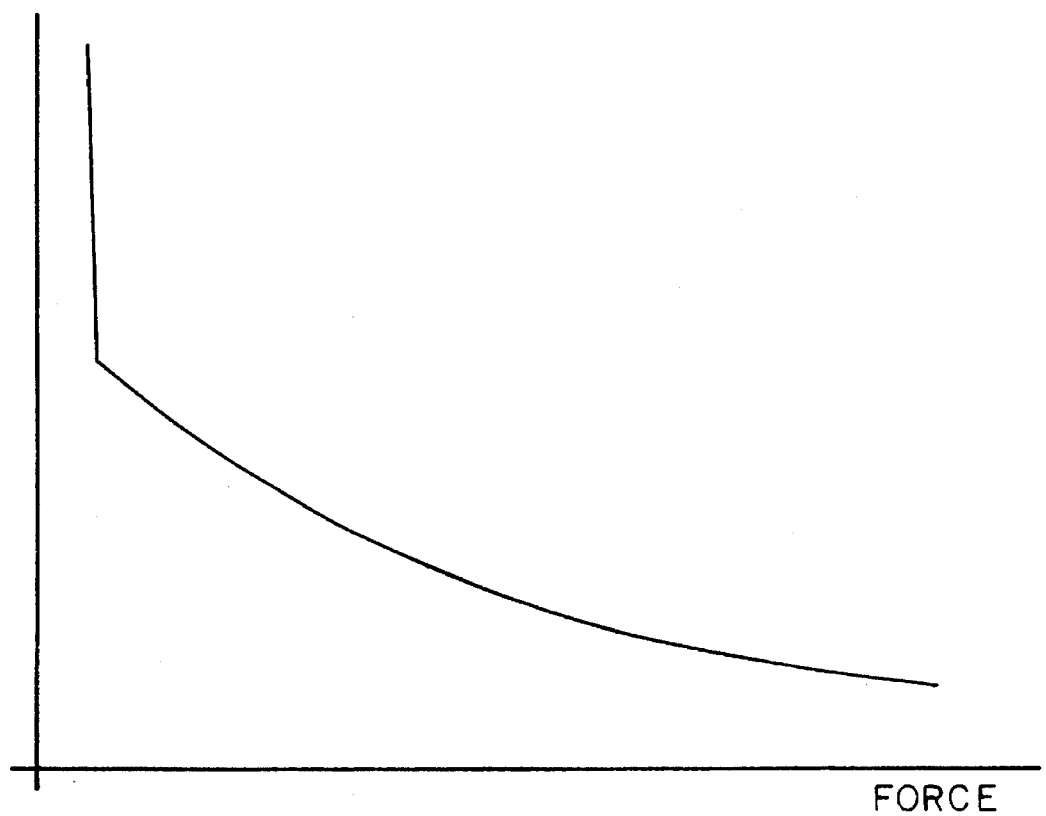
FIG. 4 illustrates a graph of the force applied to a piezoresistive element versus the output resistance of the element.

The preferred embodiment of the present invention uses force sensitive resistors since these devices are of simple construction, are easily integrated into a product from both a design and manufacturing perspective, and have some history of reliability in other products. The working parts of force sensitive resistors, (e.g., as produced by Interlink) are two layers of plastic that are parallel to one another, but spaced apart by several thousandths of an inch. The side of each sheet closest to the other sheet contains electrically conductive elements. When the sheets are squeezed together, the sheets deform such that the conductive elements from one sheet come into contact with those of the other. The electrical resistance through the circuit that is thus completed, starts off being quite high. The resistance drops as the pressure squeezing the plastic sheets together increases. A graph of force versus resistance for a typical force sensitive resistor is illustrated in FIG. 4.

In an alternative embodiment of the present invention, piezoresistive devices 15–30 can be constructed using a conductive foam material such as that commercially available from Les Burges and The Fredericks Company, Huntington Valley, Pa. The conductive foam consists of a standard reticulated foam material that has been treated with a chemical to render it electrically conductive. As the foam is compressed, its thickness decreases. Likewise, the electrical resistance as measured through the thickness, will decrease (i.e., it is piezoresistive). Similar to the characteristic of force sensitive resistors described above, this characteristic of the conductive foam is depicted in FIG. 4.

Figure 5:
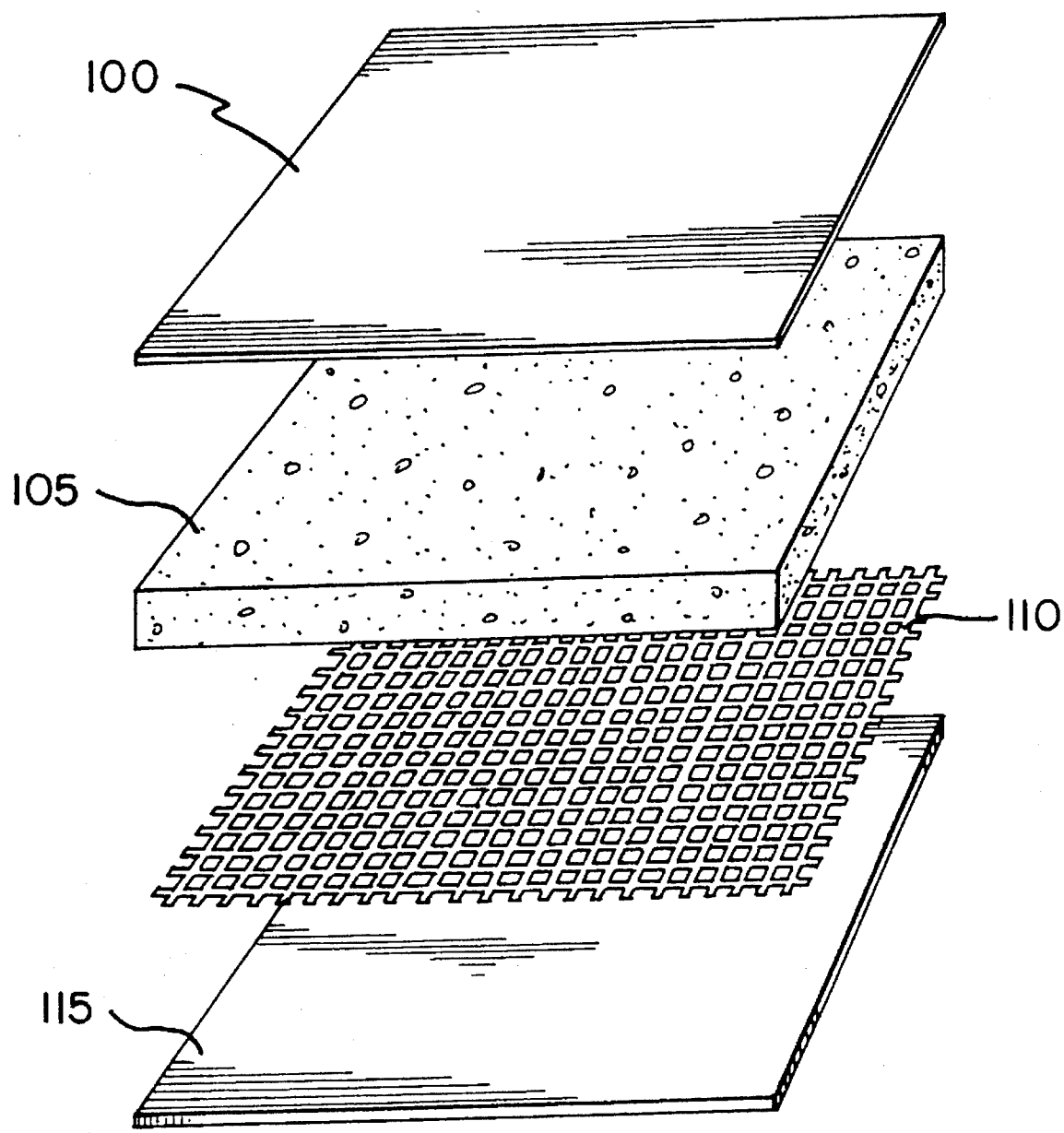
FIG. 5 is a prior art piezoresistive device.

A prior technique currently employed by The Fredericks Company to create a piezoresistive device is called "stand-off technology" and is depicted in FIG. 5. As seen in this Figure, the structure of the piezoresistive device constructed according to the Fredericks method includes the following layers: a first electrode 100, conductive foam 105, a plastic screen or mesh 110 and a second electrode 115. Plastic screen or mesh 110 acts as a stand off component. Second electrode 115 is a conductive surface, for example, a metallic plating on a printed circuit board. With a small amount of pressure, conductive foam 105 will distort through the openings of non-conductive plastic screen 110 and make contact with lower electrode 115. The circuit value of a piezoresistive device made from this structure will change from being open, to the state of having a finite resistance value e.g. 40K–50K ohms. Increasing the applied pressure will cause the resistance through the circuit to further decrease (similar that shown in FIG. 4).

Figure 6:
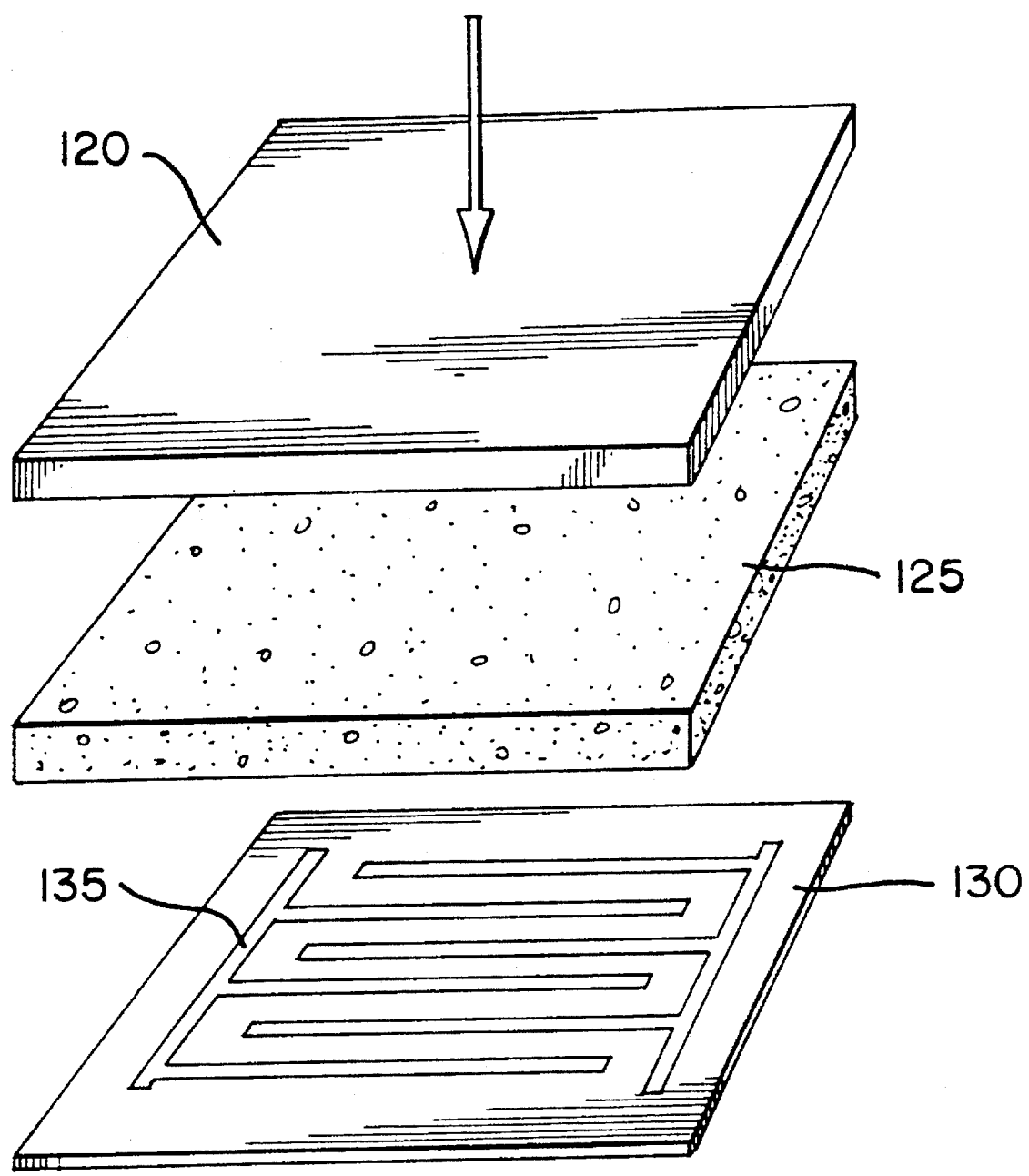
FIG. 6 is a piezoresistive device according to the present invention.

A cross-section of the novel construction of a piezoresistive device according to the present invention is illustrated in FIG. 6. As shown in this Figure, the piezoresistive device of the present invention is constructed using a hard, non-conductive (e.g., plastic) plate or actuator 120, a conductive foam 125, and a base 130 (e.g., a primed circuit board) which has a plurality of open circuit traces 135 etched thereon. It must be noted that the piezoresistive device of this embodiment of the present invention does not include a stand-off screen. Experiments have shown that a stand-off screen is not required if a foam having the right combination of thickness (e.g., ¼ inches), density, and electrical conductivity is used.

Most significantly, conductive foam 125 is used in the piezoresistive device of the present invention to provide an electrical path that bridges between interleaved open circuit traces 135. Circuit traces 135 are produced as one layer on circuit board 130. This construction eliminates the need for upper electrode 100 as used in the prior art device of FIG. 5. The piezoresistive device depicted in FIG. 6 requires fewer parts and costs less to fabricate. Apart from the inclusion in device 10 of FIGS. 1 and 2, the structure depicted in FIG. 6 can be used by itself as an piezoresistive input device such as an analog push-button for a computer or an electronic game controller.

Figure 7:
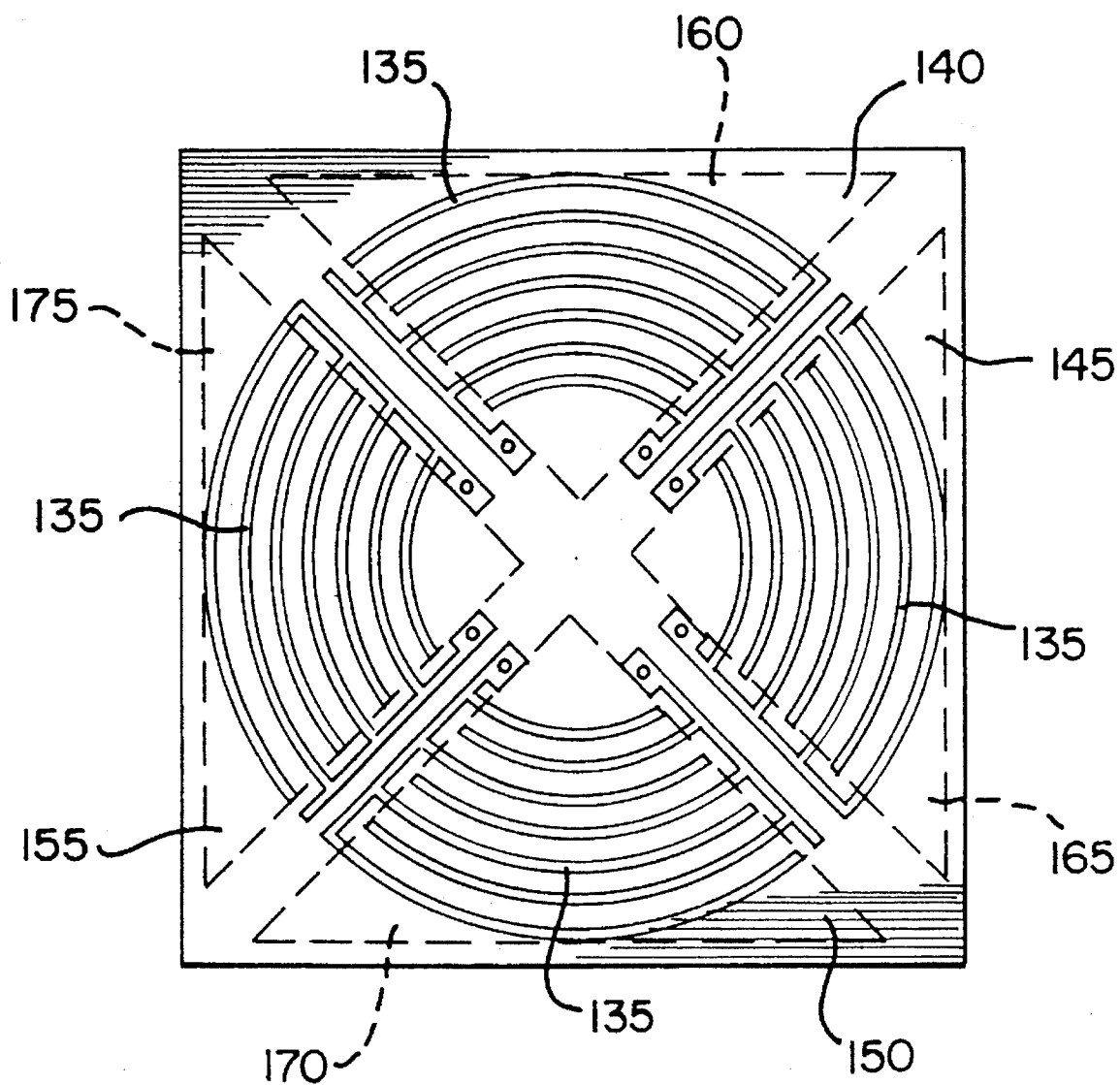
FIG. 7 illustrates a circuit layout used in one embodiment of the present invention.
Figure 8:
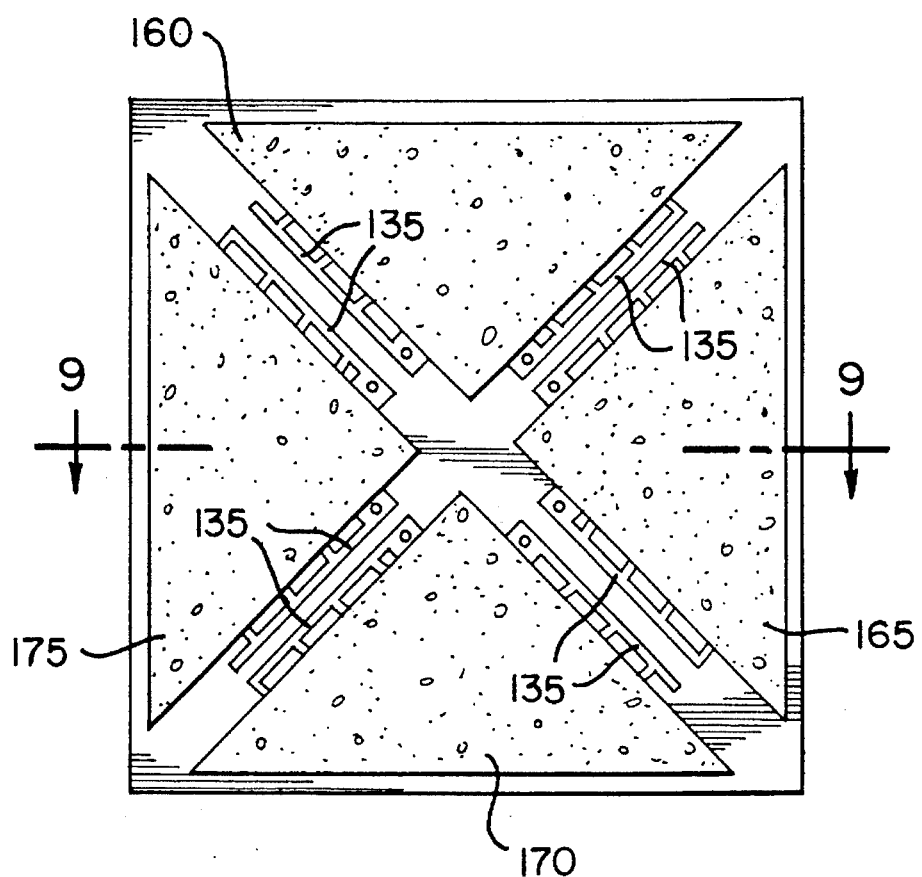
FIG. 8 depicts a device utilizing the circuit layout of FIG. 7 with conductive foam overlays.

Various patterns of interleaved electrodes (e.g., printed circuit traces) can used depending on the particular application. FIG. 7 illustrates one embodiment of interleaved electrodes. Circuit traces 135 define four separate regions, or quadrants, 140, 145, 150, 155, each having a set of interleaved circuit traces 135. In order to construct a piezoresistive device, circuits 135 of FIG. 7 can be overlaid with a single circular ring of conductive foam. Alternatively, four individual pieces of conductive foam 160, 165, 170, 175 can overlay each individual quadrant 140–155 as shown in FIG. 8. By overlaying a disk 40 (not shown in FIG. 8) above the piezoresistive device shown in FIG. 8, an operational input device can be constructed. Disk 40 has not been shown in FIG. 8 because of illustration clarity purposes, but has been included in the cross section of the device of FIG. 8 as illustrated in FIG. 9.

Figure 9:
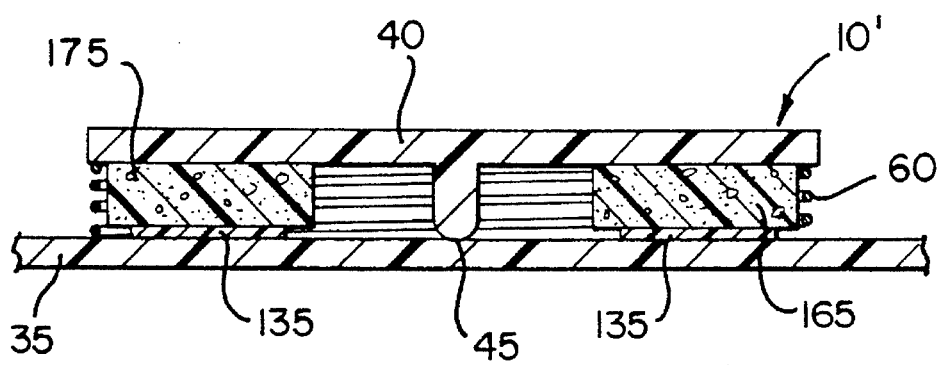
FIG. 9 is a cross section of the device of FIG. 8 taken along line 9—9.

As seen in FIG. 9, the structure of device 10' is similar to that of device 10 illustrated in FIG. 2. Where there has been no change in the structure of an element between FIGS. 2 and 9, the same number has been used to designate the element (e.g., disk 40, base 35, pivot element 45 and spring 60). The main point of difference between these two devices 10 and 10' is that in the device of FIG. 9, the conductive foam 175 and 165 in conjunction with circuit traces 135 comprise the piezoresistive device which senses a user's input. Furthermore, conductive foam 175, 165 also serves the functions of biasing and mechanical resistance previously described.

The embodiments described above clearly realize the stated objects of the invention, yet are not intended as an exhaustive compilation of the invention's content of patentable novelty. Numerous further variants will be obvious and may be effected by anyone skilled in the art without departing from the scope or spirit of the invention.

We claim:

1. A device for sensing control input by a user comprising:
   a base;
   an actuation means for accepting said control input from said user in the form of a force applied by said user, said actuation means pivoting by single point contact on said base;
   at least four piezoresistive elements disposed between said base and said actuation means, said at least four piezoresistive elements sensing said force applied by said user to said actuation means; and
   a biasing means between said piezoresistive elements and said actuation means for biasing said actuation means to a neutral position when no force is applied by said user.

2. A device according to claim 1 wherein said actuation means is a disk.

3. A device according to claim 2, wherein said disk is substantially circular.

4. A device according to claim 2, further comprising:
   a joystick mounted to a side of said disk opposite said piezoresistive elements.

5. A device according to claim 1, wherein said piezoresistive elements are force sensitive resistors.

6. A device according to claim 1, further comprising:
   an output circuit connected to said at least four piezoresistive elements, said output circuit providing signals representative of said sensed force.

7. A device according to claim 6 wherein, said at least four piezoresistive elements are arranged as opposing pairs, said output circuit comprises two bridge circuits, each of said bridge circuits further comprising:
   a ground;
   input and output nodes;
   first and second resistors;
   said first resistor and one of said piezoresistive elements of one of said opposing pairs being arranged in parallel between said input and said output nodes; and
   said second resistor and the other of said piezoresistive elements of said one of said opposing pairs being arranged in parallel between said output node and said ground.

8. A device accord rag to claim 7, wherein said first and second resistors are equal.

9. A device according to claim 1, wherein said biasing means is a foam or rubber element.

10. A device according to claim 1, further comprising an additional biasing means disposed between said user actuation means and said base.

11. A device according to claim 10, wherein said additional biasing means is a spring.

12. A device according to claim 1, wherein said piezoresistive elements are comprised from:
- at least four patterns of open circuits disposed on said base; and
- at least four pieces of conductive foam disposed between said at least four patterns of open circuits and said user actuation means.

13. A device for providing signals representative of control input by a user comprising:
- a base;
- an actuation element for accepting said control input from said user in the form of a force applied by said user, said actuation element pivoting by single point contact on said base;
- at least four piezoresistive sensors disposed between said base and said actuation element, said at least four piezoresistive sensors are arranged as first and second opposing pairs; and
- two output circuits connected to said at least four piezoresistive sensors, said two output circuits providing signals representative of said force applied by said user.

14. A device according to claim 13 wherein said two output circuit are a denoted as first and second output circuits, said first output circuit being connected to said first opposing pair of said piezoresistive sensors, said second output circuit being connected to said second opposing pair.

15. A device according to claim 14 wherein each of said first and second output circuits further comprises:
- a ground;
- input and output nodes;
- first and second resistors;
- said first resistor and one of said piezoresistive sensors of a respective one of said opposing pairs being arranged in parallel between said input and said output nodes; and
- said second resistor and the other of said piezoresistive sensors of said respective one of said opposing pairs being arranged in parallel between said output node and said ground.

16. A piezoresistive input device according to claim 13 comprising:
- a foam or rubber element between said piezoresistive sensors and said actuation element for biasing said actuation element to a neutral position when no force is applied by said user.

17. A device according to claim 16, further comprising:
- a spring disposed between said user actuation element and said base.

* * * * *